(12) United States Patent
Kim et al.

(10) Patent No.: US 7,499,225 B2
(45) Date of Patent: Mar. 3, 2009

(54) COMPACT ZOOM LENS OPTICAL SYSTEM AND DRIVING METHOD OF THE SAME

(75) Inventors: Moon-Hyun Kim, Seoul (KR); Jin-Hee Kang, Gyeonggi-do (KR)

(73) Assignee: Diostech Co., Ltd., Kyunggi-Do (KR)

( * ) Notice: Subject to any disclaimer, the term of this patent is extended or adjusted under 35 U.S.C. 154(b) by 0 days.

(21) Appl. No.: 11/933,768

(22) Filed: Nov. 1, 2007

(65) Prior Publication Data

US 2008/0285145 A1 Nov. 20, 2008

(30) Foreign Application Priority Data

May 15, 2007 (KR) .................... 10-2007-0047092

(51) Int. Cl.
*G02B 15/14* (2006.01)
*G02B 17/00* (2006.01)

(52) U.S. Cl. ...................... 359/686; 359/726

(58) Field of Classification Search ............. 359/676, 359/683, 686, 726–736
See application file for complete search history.

(56) References Cited

U.S. PATENT DOCUMENTS

| | | | |
|---|---|---|---|
| 7,218,455 B2 * | 5/2007 | Iwasawa | 359/680 |
| 2004/0012704 A1 * | 1/2004 | Hagimori et al. | 348/335 |
| 2004/0062535 A1 * | 4/2004 | Hagimori et al. | 396/72 |
| 2007/0024984 A1 * | 2/2007 | Iwasawa | 359/680 |

\* cited by examiner

*Primary Examiner*—Darryl J Collins
(74) *Attorney, Agent, or Firm*—Duane Morris LLP

(57) ABSTRACT

A refractive-type zoom lens optical system includes a first lens group having a negative lens power and including a reflection member, a second lens group having a negative lens power, a third lens group having a positive lens power, a fourth lens group having a negative lens power, and a stop between the second lens group and the third lens group, wherein an overall length of the system is fixed during zooming and focusing.

11 Claims, 4 Drawing Sheets

COMPACT ZOOM LENS OPTICAL SYSTEM AND DRIVING METHOD OF THE SAME

The present invention claims the benefit of Korean Patent Application No. 10-2007-0047092 filed on May 15, 2007, which is hereby incorporated by references.

BACKGROUND OF THE INVENTION

1. Field of the Invention

The present invention relates to a zoom lens optical system, and more particularly, to a compact zoom lens optical system and a driving method of the same, which is applied to a small-sized system using electronic image sensing devices, such as charge coupled devices (CCDs) or complementary metal oxide semiconductor (CMOS) devices.

2. Discussion of the Related Art

Among optical systems needed to have compact sizes, those for mobile/potable devices should be further small-sized.

Especially, to make such a small optical system that is able to be mechanically set up while maintaining its performance and magnifying capacity, the optical system, beneficially, comprises an optical element including a reflective surface that reflects an optical path. The optical system, in which the optical path is bent at a right angle by the reflective plane, may be set up to a small device, and thus a size of the device can be further effectively decreased.

By the way, in a trend of miniaturizing mobile devices, to adopt a zoom lens optical system including a reflective surface in the mobile device, the optical system may have high resolution despite its small size as well as an optical overall length and a device size may be remarkably decreased.

In general optical systems, a zoom optical system that has performance of mega lens resolution and small size is a four-group zoom system, and, in the optical system, generally, second and third lens groups move to change zoom magnification, and a fourth lens group moves to adjust a focus.

However, the optical system has a disadvantage that it has high resolution at a specific object distance. This is why it is hard to correct aberration for other object distance because a lens group for zooming and a lens group for focusing are disposed at the same side with respect to a stop in the optical system.

SUMMARY OF THE INVENTION

Accordingly, the present invention is directed to a compact zoom lens optical system and a driving method of the same.

The present invention is to provide a compact zoom lens optical system that achieves high aberration correction and auto-focusing at substantially almost all object distances, although an overall length is short.

The present invention is to provide a compact zoom lens optical system that has high resolution at substantially almost all object distances.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a refractive-type zoom lens optical system includes a first lens group having a negative lens power and including a reflection member, a second lens group having a negative lens power, a third lens group having a positive lens power, a fourth lens group having a negative lens power, and a stop between the second lens group and the third lens group, wherein an overall length of the system is fixed during zooming and focusing.

In another aspect, a driving method of a refractive-type zoom lens optical system, which includes a first lens group having a negative lens power and including a reflection member, a second lens group having a negative lens power, a third lens group having a positive lens power, a fourth lens group having a negative lens power, and a stop between the second lens group and the third lens group, wherein an overall length of the system is fixed during zooming and focusing, includes controlling magnification of the system by moving the third and fourth lens groups and controlling a focus of the system by moving the second lens group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred exemplary embodiment, an example of which is illustrated in the accompanying drawings.

Figure 1A:
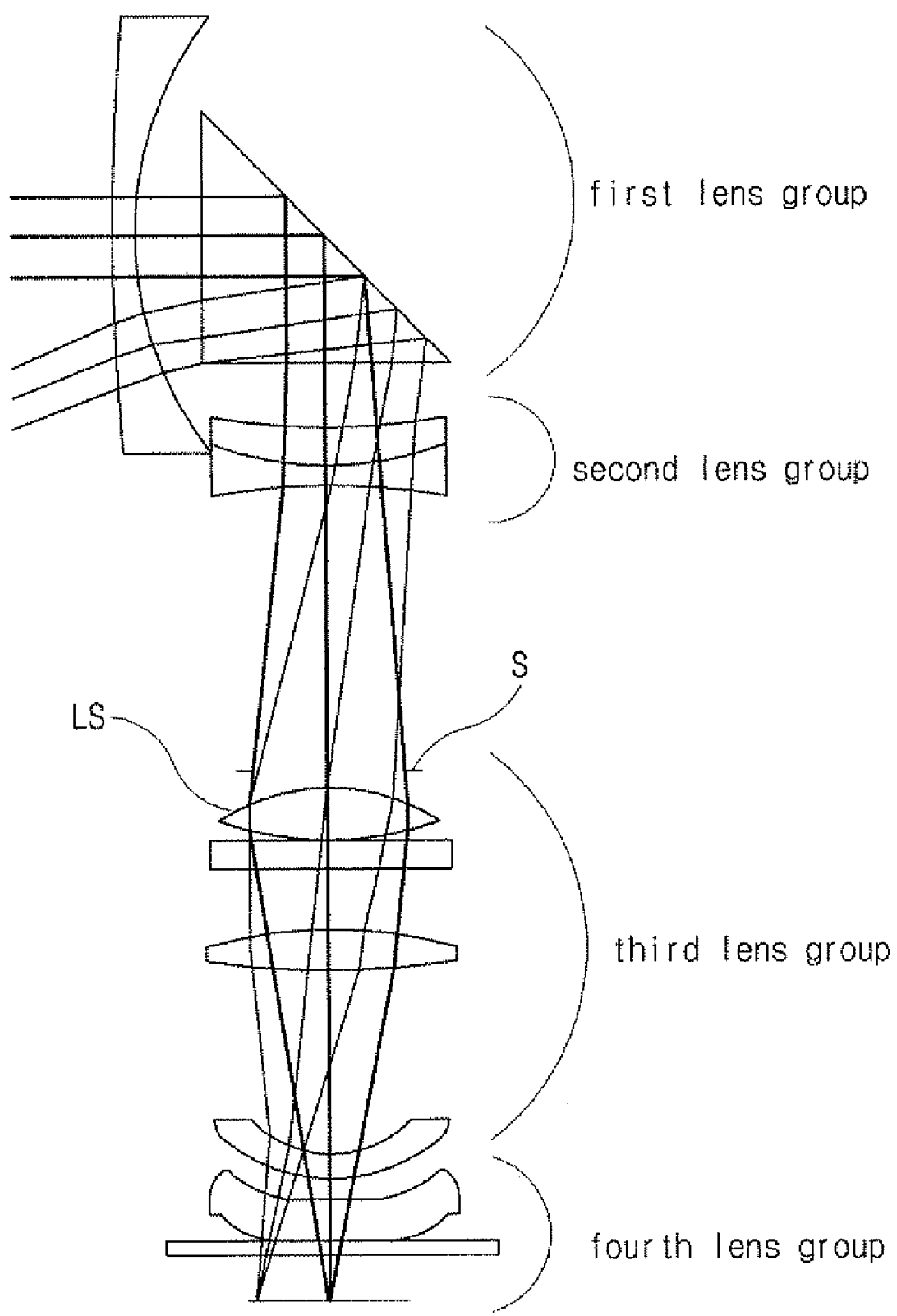
FIGS. 1A and 1B are views of illustrating a refractive-type zoom lens optical system according to an exemplary embodiment of the present invention in a telephoto mode and a wide-angle mode, respectively.
Figure 1B:
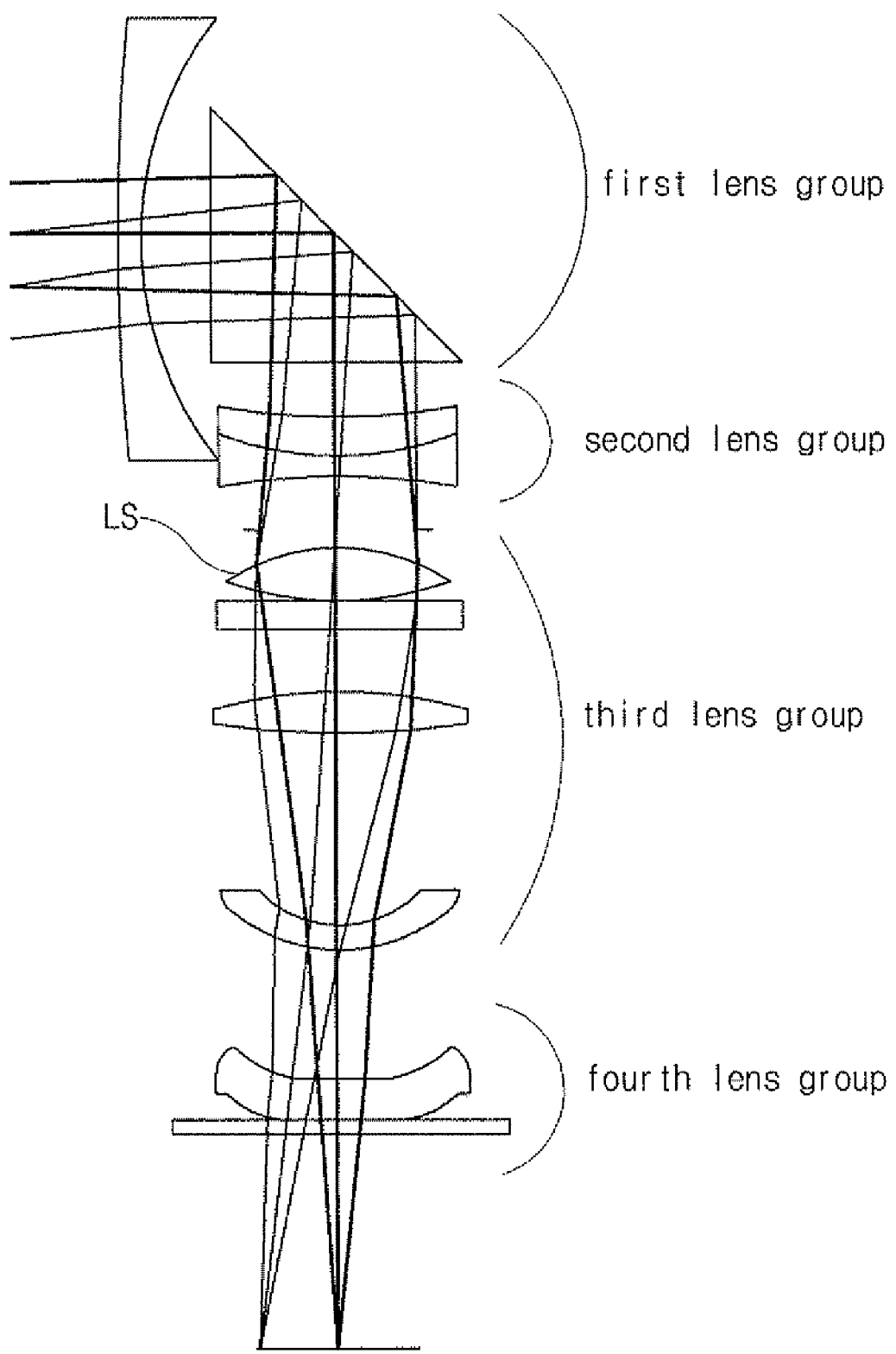
Figure 2A:
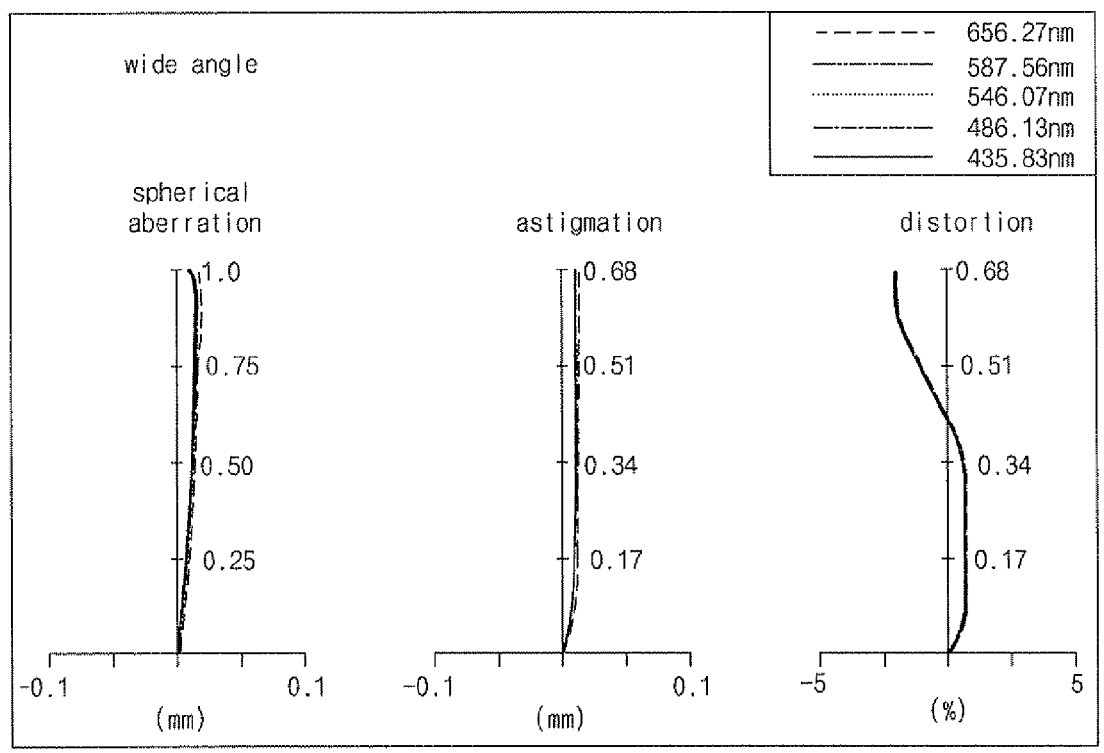
FIGS. 2A and 2B are views of illustrating aberrations of a refractive-type zoom lens optical system according to the exemplary embodiment of the present invention in a telephoto mode and a wide-angle mode, respectively.
Figure 2B:
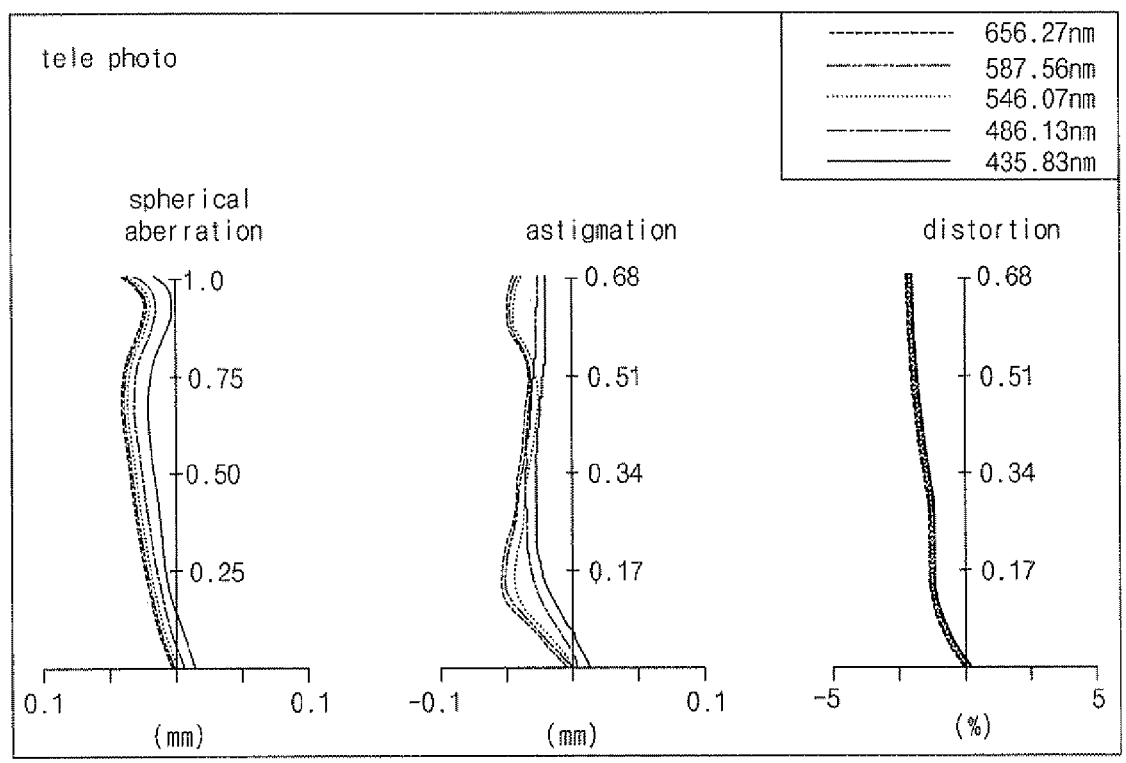

FIGS. 1A and 1B are views of illustrating a refractive-type zoom lens optical system according to an exemplary embodiment of the present invention in a telephoto mode and a wide-angle mode, respectively. FIGS. 2A and 2B are views of illustrating aberrations of a refractive-type zoom lens optical system according to the exemplary embodiment of the present invention in a telephoto mode and a wide-angle mode, respectively, and show spherical aberration, astigmatism and distortion.

As illustrated in FIGS. 1A and 1B, the refractive-type zoom lens optical system includes first, second, third and fourth lens groups in order. The refractive-type zoom lens optical system further includes a stop S between the second and third lens groups. The first lens group includes a reflection member. The first lens group has a negative refractive power, the second lens group has a negative refractive power, the third lens group has a positive refractive power, and the fourth lens group has a negative refractive power. The first lens group has a first focal length $f1$, the second lens group has a second focal length $f2$, the third lens group has a third focal length $f3$, and the fourth lens group has a fourth focal length $f4$.

An overall length of the refractive-type zoom lens optical system is not changed during zooming and focusing.

In the refractive-type zoom lens optical system, during zooming, the third and fourth lens groups move to thereby vary magnification. The second lens group moves to thereby adjust a focus.

Like this, when the first and second lens groups have negative refractive powers, an effective aperture of a first lens, which first meets light, becomes smaller. Accordingly, the size of a lens barrel becomes small, and thus a total size of the system gets smaller.

Moreover, when the third lens group has a positive refractive power and the fourth lens group has a negative refractive power, the powers of the lenses are divided as a telephoto type. Therefore, the system has a short optical overall length.

In the present invention, since the third lens group for zooming is under the heaviest power load and has the largest aberrations, the second lens group is disposed opposite to the third lens group with respect to the stop S so that the second lens group correct the aberrations while auto-focusing. This is why a structure of distributing a power with respect to the stop S is effective for correcting aberration of a lens in an optical system.

Particularly, in a structure in which lenses move, such as a zoom lens, it is needed to effectively correct an aberration load of a zooming lens group, which moves under the heaviest power load and corresponds to the third lens group of the present invention. Accordingly, it is possible to obtain high auto-focusing effect by disposing the second lens group, which moves for aberration correction and auto-focusing, opposite to the third lens group with respect to the stop S.

Meanwhile, the second lens group includes a positive lens and a negative lens. That is, the second lens group for auto-focusing includes positive and negative lenses. Thus, much higher effects of aberration correction are obtained during auto-focusing.

In addition, when an Abbe number of a material of the positive lens in the second lens group is V2p and an Abbe number of a material of the negative lens in the second lens group is V2n, it is desirable that the Abbe numbers V2p and V2n are under the following relation condition (1).

$$1 < V2n/V2p < 3 \tag{1}$$

Since the second lens group satisfying the relation condition (1) helps correction of chromatic aberration, effects of aberration correction and auto-focusing are more improved.

Moreover, the second and third focal lengths f2 and f3, beneficially, are under the following relation condition (2).

$$-4.0 < f2/f3 < -1.8 \tag{2}$$

The relation condition (2) is directed to appropriate power distribution between the third lens group and the second lens group, wherein the third lens group has the strongest power and zooms, and the second lens group auto-focuses and effectively corrects the aberrations of the third lens group as stated above. The system including second and third lens groups that satisfy the relation condition (2) has high resolution and proper magnification even if the system has a short overall length.

In the relation condition (2), if f2/f3 is larger than the upper limit, sufficient magnification is not obtained because the third lens group has a weak power, and the function as a zoom lens gets weaker. In addition, if the negative power of the second lens group becomes stronger and the positive power of the third lens group gets weaker, an overall positive power goes weaker. Therefore, the overall length of the system gets longer, and it is difficult to make a short-sized system.

On the other hand, if f2/f3 is smaller than the lower limit, it is difficult to correct the aberrations of the third lens group sufficiently because the power of the second lens group becomes weaker. Accordingly, the resolution of the system is lowered during auto-focusing, and it is not easy to make up an apparatus for the system due to increasing strokes of auto-focusing.

As mentioned above, in the present invention, since the third lens group has a positive refractive power and the fourth lens group has a negative refractive power, the powers of the lenses are divided as a telephoto type, and thus, the system can have a short optical overall length.

To vary the magnification, the third lens group for zooming moves itself, and at this time, a distance between the stop S and the third lens group is not changed and is fixed. That is, when the third lens group moves, the stop S moves, too.

In a structure where a stop is fixed during zooming, since a lens for zooming can collide with the stop according as the lens moves, an overall length of a zoom lens optical system should get longer by considering mechanical margins so that the lens for zooming may not collide with the stop.

By the way, in the present invention, because the third lens group and the stop S move together, the system may have a small size. In addition, if the distance between the third lens group and the stop S is fixed, less aberration may be caused. Therefore, it is easy to correct the aberration, and thus high resolution can be achieved.

In the meantime, it is desirable for effective power distribution that, among lenses included in the third lens group, a lens LS adjacent to the stop S has the largest refractive power and at least one surface of the lens LS has an aspherical surface. If a lens of the third lens group has the largest refractive power and the lens is adjacent to the stop, little aberration is caused, and high resolution can be obtained. Moreover, since the lens has at least one aspherical surface, the overall length can be short, and high performance can be maintained.

When the lens LS adjacent to the stop S has a focal length fLS, it is beneficial that the focal lengths fLS and f3 are under the following condition (3).

$$0.75 < fLS/f3 < 1.45 \tag{3}$$

Here, if fLS/f3 is larger than the upper limit in the condition (3), the power load of a first portion of the third lens group around the stop S gets lighter, and the power load of a second portion of the third lens group opposite to the first portion the grows heavier. Therefore, it is difficult to obtain high resolution. If fLS/f3 is smaller than the lower limit, the lens power is concentrated around the stop S to cause excessive aberration. Accordingly, it is hard to achieve high resolution.

Tables 1 to 3 show examples of data for designing the refractive-type zoom lens optical system as described above. Table 1 shows R, D, Nd and Vd values of each lens constituting the system according to the present invention, Table 2 shows aspherical surface coefficients, and Table 3 shows zoom data. Here, R represents a radius of curvature of a lens surface, D represents a thickness of a lens or a distance between adjacent lenses, Nd represents a d-line index of refraction of a material, and Vd represents an Abbe number of the material, wherein the d-line indicates light having a wavelength of 587.56 nm.

TABLE 1

| Surface # | Surface type | R value | D value | | Nd | Vd |
|---|---|---|---|---|---|---|
| | | infinity | infinity | (zoom) | | |
| 1 | aspheridal surface | −5.2440 | 0.1245 | | 1.544100 | 56.09 |
| 2 | aspheridal surface | 3.9642 | 0.3298 | | | |
| 3 | | infinity | 1.2713 | | 1.834000 | 37.35 |
| 4 | | infinity | 0.0693 | | | |
| 5 | | infinity | 0.2564 | (zoom) | | |

TABLE 1-continued

| Surface # | Surface type | R value | D value | | Nd | Vd |
|---|---|---|---|---|---|---|
| 6 | | -4.0860 | 0.2060 | | 1.846663 | 23.78 |
| 7 | | -1.6322 | 0.1156 | | 1.729160 | 54.67 |
| 8 | | 5.3079 | 1.4292 | (zoom) | | |
| stop | | infinity | 0.0836 | | | |
| 10 | aspherical surface | 0.9122 | 0.2812 | | 1.495330 | 80.94 |
| 11 | aspherical surface | -1.5808 | 0.0231 | | | |
| 12 | | -2.6963 | 0.1156 | | 1.846663 | 23.78 |
| 13 | | -135.7942 | 0.2893 | | | |
| 14 | | 1.9797 | 0.2039 | | 1.496997 | 81.61 |
| 15 | | -8.6919 | 0.9410 | | | |
| 16 | aspherical surface | -0.5791 | 0.1156 | | 1.544100 | 56.09 |
| 17 | aspherical surface | -1.3119 | 0.1116 | (zoom) | | |
| 18 | aspherical surface | 1.3411 | 0.2157 | | 1.544100 | 56.09 |
| 19 | aspherical surface | 1.2638 | 0.0000 | | | |
| 20 | | infinity | 0.0000 | | | |
| 21 | | infinity | 0.0693 | | 1.516798 | 64.20 |
| 22 | | infinity | 0.2311 | (zoom) | | |
| 23 | | infinity | 0.0123 | (zoom) | | |

As stated above, the first lens group has the first focal length f1, the second lens group has the second focal length f2, the third lens group has the third focal length f3, the fourth lens group has the fourth focal length f4, and the lens of the third lens group adjacent to the stop S has the focal length fLS. At this time, a shape of an aspherical surface is represented by the following equations (1), (2) and (3):

$$Z = \frac{CR^2}{1+\sqrt{1-(a_1+1)C^2R^2}} + a_3R^3 + a_4R^4 + a_5R^5 + a_6R^6 + a_7R^7 + a_8R^8 + a_9R^9 + a_{10}R^{10} \quad \text{equation (1)}$$

$$R = \sqrt{X^2 + Y^2} \quad \text{equation (2)}$$

$$C = \frac{1}{\text{radius}} \quad \text{equation (3)}$$

wherein Z is a displacement from an apex of a lens along an optical axis direction, R is a distance from the apex of the lens along a direction perpendicular to the optical axis, C is an inverse number of a radius of curvature, $a_1$ is a conic number, and a3, a4, a5, a6, a7, a8, a9 and a10 are aspherical surface coefficients.

TABLE 2

| | #1 | #2 | #10 | #11 |
|---|---|---|---|---|
| K | -2.0000000000E+00 | -5.0000000000E+00 | -1.0438626000E+00 | -6.2641852000E-01 |
| a1 | 0.0000000000E+00 | 0.0000000000E+00 | 0.0000000000E+00 | 0.0000000000E+00 |
| a2 | 0.0000000000E+00 | 0.0000000000E+00 | 0.0000000000E+00 | 0.0000000000E+00 |
| a3 | -1.6290375809E-01 | -2.0038479594E-01 | 1.8794409793E-02 | 2.6343305167E-02 |
| a4 | 1.7658981513E+00 | 1.9805694111E+00 | -3.8380755348E-01 | -5.4893484407E-01 |
| a5 | -3.1608944330E+00 | -3.3958595763E+00 | 3.2437581101E+00 | 5.7252174418E+00 |
| a6 | 2.0261528647E+00 | 1.6623128330E+00 | -1.1902153289E+01 | -2.3662529352E+01 |
| a7 | 3.9145088307E-01 | 1.7094281803E+00 | 2.0469496383E+00 | 4.5386519386E+01 |
| a8 | -1.3036157142E+00 | -2.8630038949E+00 | -1.3957462004E+01 | -3.3698275318E+01 |
| a9 | 7.2357575900E-01 | 1.6001471447E+00 | 0.0000000000E+00 | -1.5377906873E-02 |
| a10 | -1.4168402717E-01 | -3.1920965611E-01 | 0.0000000000E+00 | 2.0848150723E-03 |

| | #16 | #17 | #18 | #19 |
|---|---|---|---|---|
| K | -1.7163909000E-01 | -4.1625656000E+00 | 8.9999998000E-01 | -1.0669251000E+00 |
| a1 | 0.0000000000E+00 | 0.0000000000E+00 | 0.0000000000E+00 | 0.0000000000E+00 |
| a2 | 0.0000000000E+00 | 0.0000000000E+00 | 0.0000000000E+00 | 0.0000000000E+00 |
| a3 | -7.2682295778E-01 | -1.1152979675E+00 | -3.3503371761E+00 | -3.6023774015E+00 |
| a4 | 4.9219176674E+00 | 9.7075303465E+00 | 3.5980178436E+01 | 3.6305663236E+01 |
| a5 | 3.3692394412E+01 | -4.1423291495E+01 | -2.6603869626E+02 | -2.4465592778E+02 |
| a6 | -7.4215689964E+02 | -5.3138963938E+01 | 1.0894925998E+03 | 9.1592915459E+02 |
| a7 | 4.7592337916E+03 | 1.0554888620E+03 | -2.7585270966E+03 | -2.0496701855E+03 |
| a8 | -1.4993682793E+04 | -3.7419517547E+03 | 4.4008120168E+03 | 2.7312162431E+03 |
| a9 | 2.3588366620E+04 | 537368533523E+03 | -4.28548018758E+03 | -2.0278402964E+03 |
| a10 | -1.4778969384E+04 | -3.3051560300E+03 | 2.0180220991E+03 | 6.6227575871E+02 |

TABLE 3

| | Object | | | | |
|---|---|---|---|---|---|
| | #5 | #8 | #17 | #22 | #23 |
| infinity | 0.25639 | 1.42925 | 0.11165 | 0.23108 | 0.01225 |
| 231.149738 | 0.24294 | 1.44284 | 0.11165 | 0.23104 | 0.01225 |
| infinity | 0.57210 | 0.67727 | 0.34210 | 0.44454 | 0.00462 |
| 231.149738 | 0.55984 | 0.68952 | 0.34210 | 0.44472 | 0.00439 |
| infinity | 0.17359 | 0.21196 | 0.61532 | 1.06831 | -0.02866 |
| 231.149738 | 0.16019 | 0.22560 | 0.61532 | 1.06862 | -0.02912 |

In the example, the focal length of a wide-angle mode is 1, and the focal length of a telephoto mode is 2.8. The value of V2n/V2p is 2.298, the value of f2/f3 is -2.90, and the value of fLS/f3 is 0.9694.

According to the present invention, in a refractive-type zoom lens optical system used for a compact device, such as mobile apparatus, even though the system has a short overall length, high aberration correction and auto-focusing can be achieved. Therefore, high resolution can be obtained.

It will be apparent to those skilled in the art that various modifications and variations can be made in the system without departing from the spirit or scope of the invention. Thus, it is intended that the present invention covers the modifications and variations of this invention provided they come within the scope of the appended claims and their equivalents.

What is claimed is:

1. A refractive-type zoom lens optical system, comprising:
   a first lens group having a negative lens power and including a reflection member;
   a second lens group having a negative lens power;
   a third lens group having a positive lens power;
   a fourth lens group having a negative lens power; and
   a stop between the second lens group and the third lens group,
   wherein an overall length of the system is fixed during zooming and focusing.

2. The system according to claim 1, wherein third and fourth lens groups are movable for controlling magnification of the system.

3. The system according to claim 1, wherein the second lens group is movable for controlling a focus of the system.

4. The system according to claim 1, wherein the second lens group includes a positive lens and a negative lens.

5. The system according to claim 4, wherein an Abbe number of a material of the positive lens in the second lens group is V2p and an Abbe number of a material of the negative lens in the second lens group is V2n such that the Abbe numbers V2p and V2n satisfy a condition of $1 < V2n/V2p < 3$.

6. The system according to claim 1, wherein the second lens group has a focal length of f2 and the third lens group has a focal length f3 such that the focal lengths f2 and f3 satisfy a condition of $-4.0 < f2/f3 < -1.8$.

7. The system according to claim 1, wherein the third lens group is movable such that a distance between the stop and the third lens group is fixed.

8. The system according to claim 1, wherein a lens of the third lens group is adjacent to the stop and has a largest refractive power, wherein the lens includes at least one aspherical surface.

9. The system according to claim 8, wherein the third lens group has a focal length f3 and the lens of the third lens group has a focal length fLS such that the focal lengths f3 and fLS satisfy a condition of $0.75 < fLS/f3 < 1.45$.

10. A driving method of a refractive-type zoom lens optical system, which includes a first lens group having a negative lens power and including a reflection member, a second lens group having a negative lens power, a third lens group having a positive lens power, a fourth lens group having a negative lens power, and a stop between the second lens group and the third lens group, wherein an overall length of the system is fixed during zooming and focusing, the method comprising:
    controlling magnification of the system by moving the third and fourth lens groups; and
    controlling a focus of the system by moving the second lens group.

11. The driving method according to claim 10, wherein controlling the magnification of the system includes moving the stop such that a distance between the stop and the third lens group is fixed.

* * * * *